United States Patent
Ono et al.

(10) Patent No.: US 6,725,395 B2
(45) Date of Patent: Apr. 20, 2004

(54) METHOD FOR ASSIGNING ALTERNATIVE SECTOR, METHOD FOR READING DATA, DISK DRIVE APPARATUS, AND APPARATUS FOR WRITING/READING AV DATA

(75) Inventors: Hiroyuki Ono, Fujisawa (JP); Hideo Asano, Tokyo (JP); Atsushi Kanamaru, Sagamihara (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 527 days.

(21) Appl. No.: 09/754,678

(22) Filed: Jan. 4, 2001

(65) Prior Publication Data

US 2001/0021983 A1 Sep. 13, 2001

(30) Foreign Application Priority Data

Jan. 6, 2000 (JP) ........................................ 2000-001140

(51) Int. Cl.⁷ ................................................ G06F 11/08
(52) U.S. Cl. ......................... 714/8; 714/710; 711/170; 369/53.15; 369/53.17
(58) Field of Search ............................... 714/5, 8, 710, 714/711; 369/53.15, 53.17; 360/53; 711/112, 170

(56) References Cited

U.S. PATENT DOCUMENTS 6,189,110 B1 * 2/2001 Saitoh et al. ................ 714/8
6,272,085 B1 * 8/2001 Maeda ..................... 369/53.17
6,463,024 B1 * 10/2002 Park ......................... 369/53.15

FOREIGN PATENT DOCUMENTS

| JP | 05-66999 | 3/1993 |
|---|---|---|
| JP | 08-167250 | 6/1996 |
| JP | 11-232046 | 8/1999 |

* cited by examiner

Primary Examiner—Robert Beausoliel
Assistant Examiner—Joseph D Manoskey
(74) Attorney, Agent, or Firm—Abdy Raissinia; Bracewell & Patterson, L.L.P.

(57) ABSTRACT

A method and apparatus for minimizing performance degradation resulting from reassignment of data to alternate sectors as a result of a defect within the original sector.

For example, when a request for writing data "a" into a sector A is made but the data is written into an alternative sector A' in an alternative sector area X because the sector A is defective. Therefore, when a write request for writing data "b" into a sector B is made subsequently, re-assignment is performed to a sector B' subsequent to the alternative sector A'. Similarly, a defective sector C for which a request for writing data "c" is made is re-assigned an alternative sector C'. Thus, the successive data a, b, and c are written into the successive sectors A', B', and C' in the same alternative sector area X, minimizing performance degradation.

13 Claims, 10 Drawing Sheets

[Figure 1]
(a)
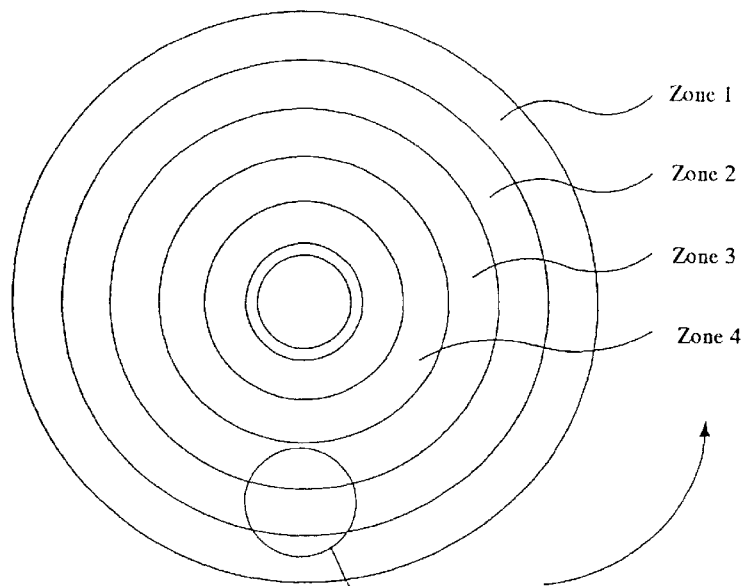
(b)
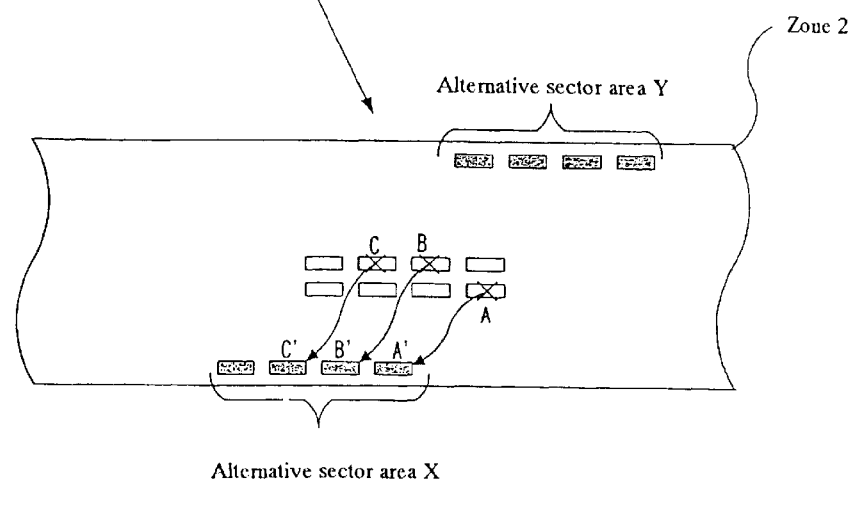

[Figure 2]
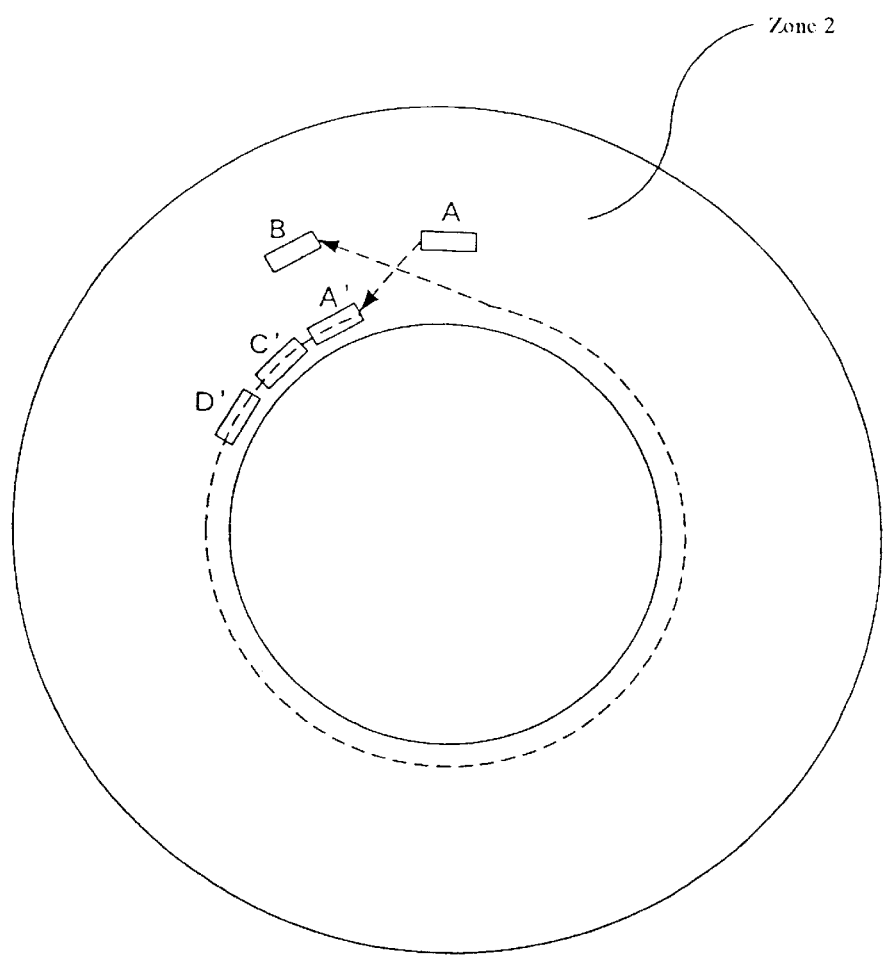

[Figure 3]
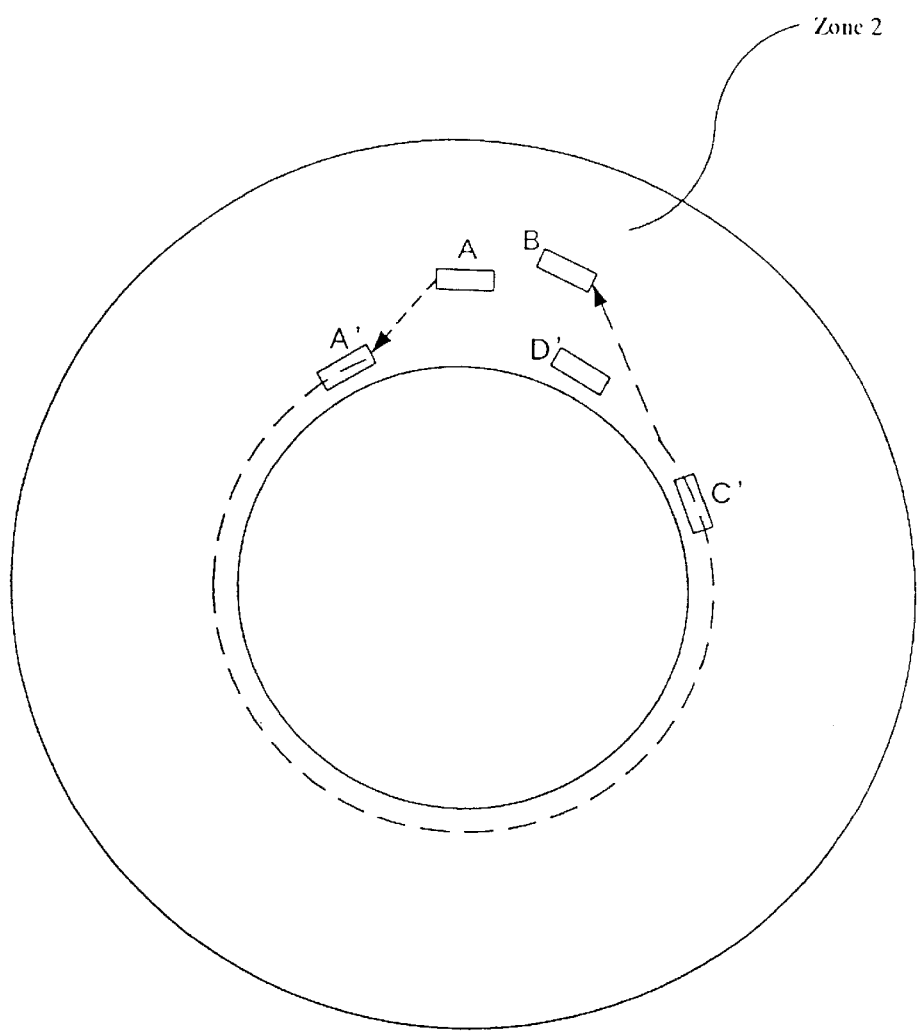
☐ : Sector
--- : Head trajectory

[Figure 4]
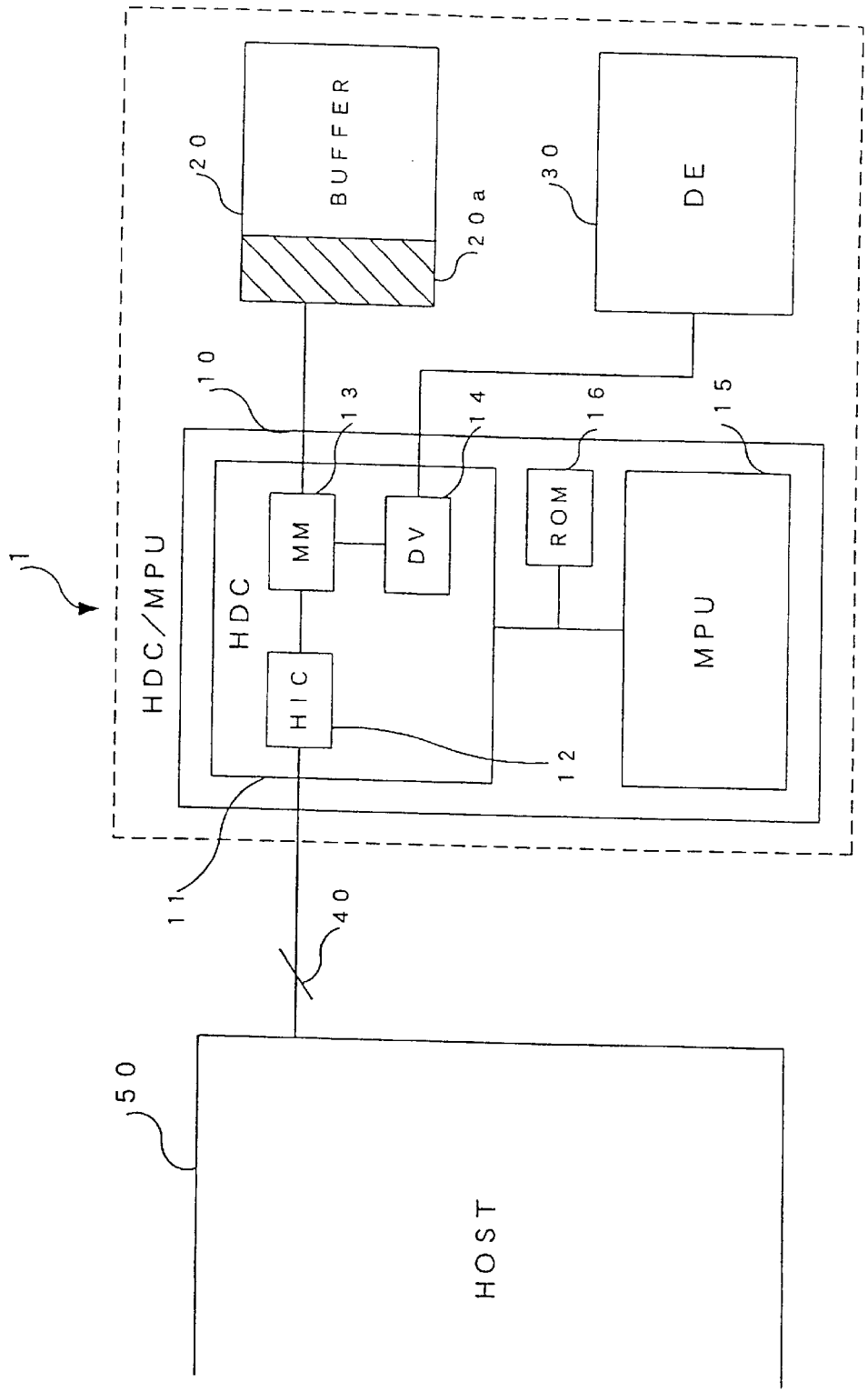

[Figure 5]
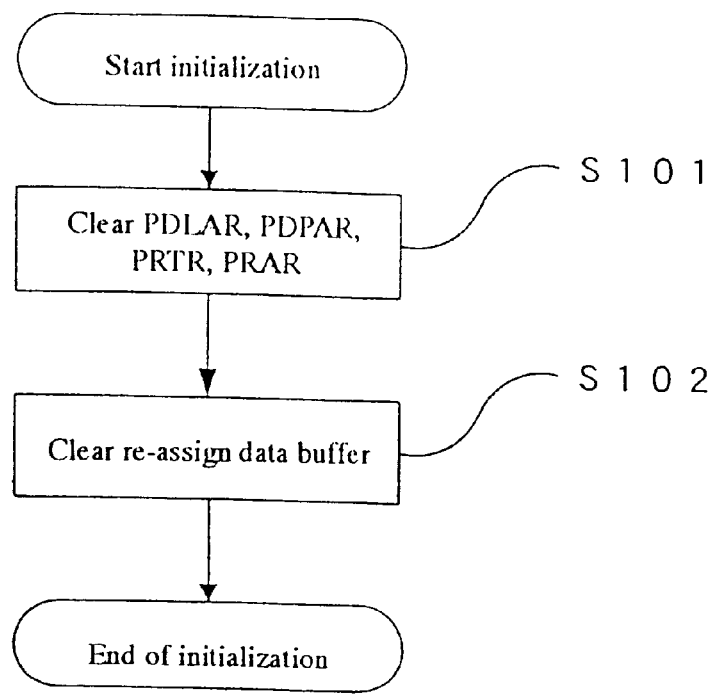

[Figure 6]
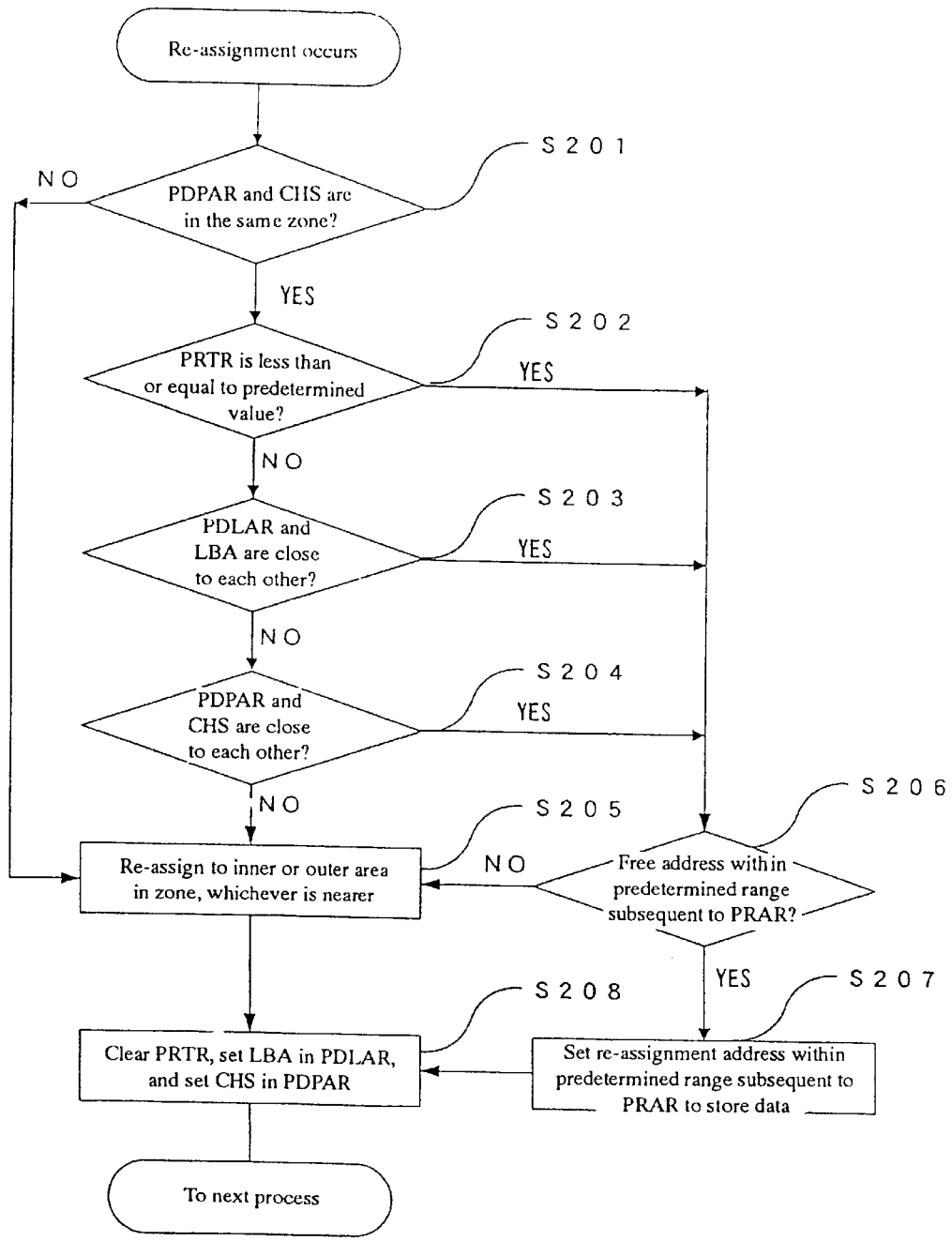

[Figure 7]
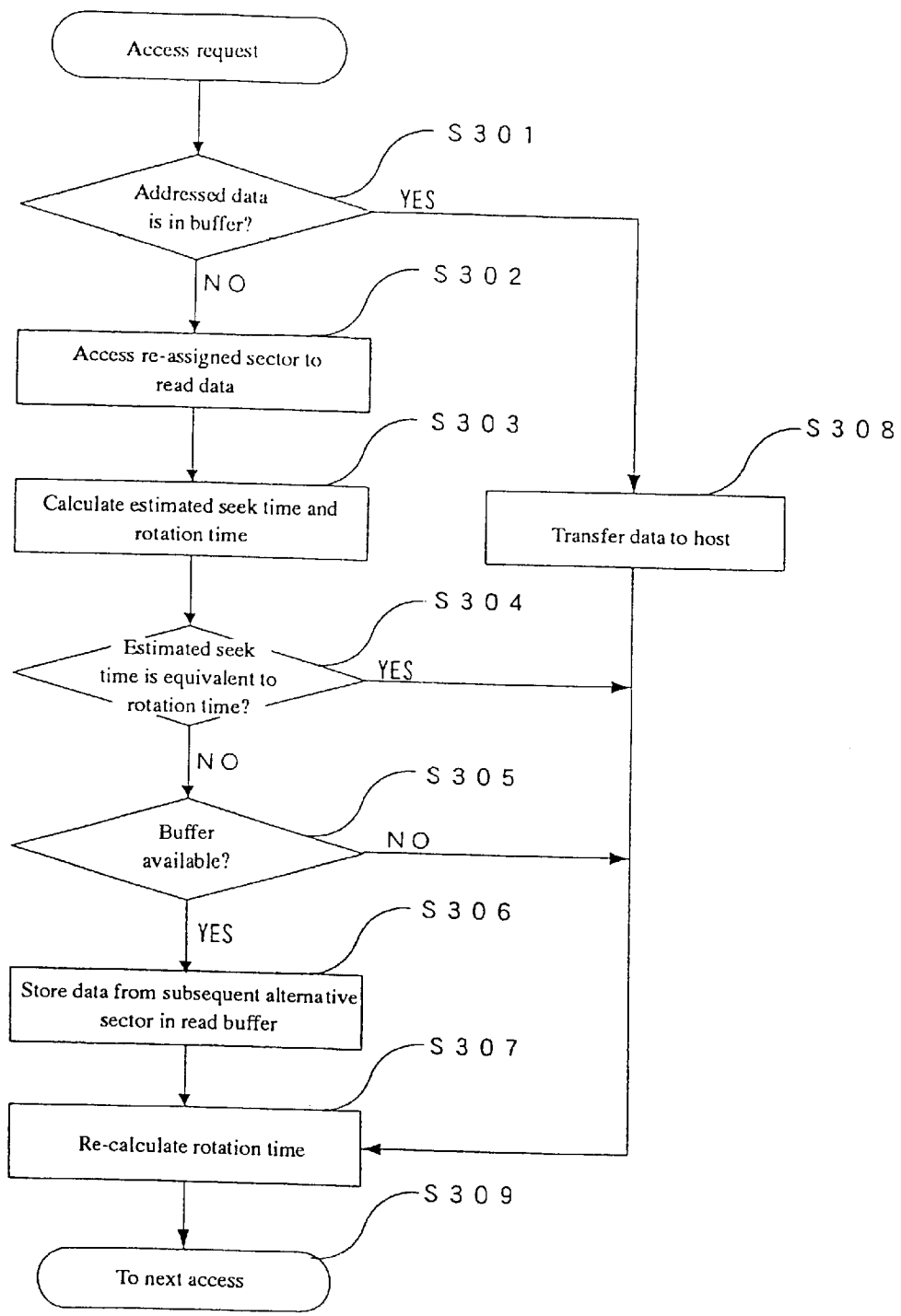

[Figure 8]
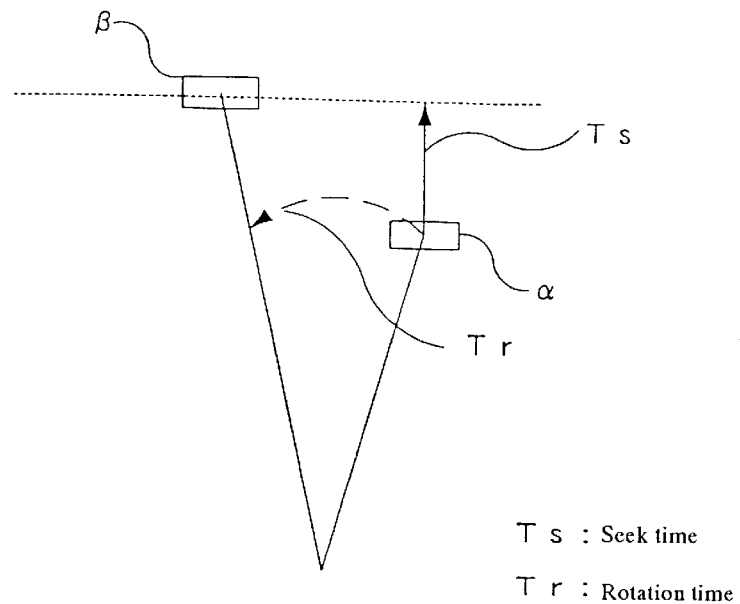
T s : Seek time
T r : Rotation time
[Figure 9]
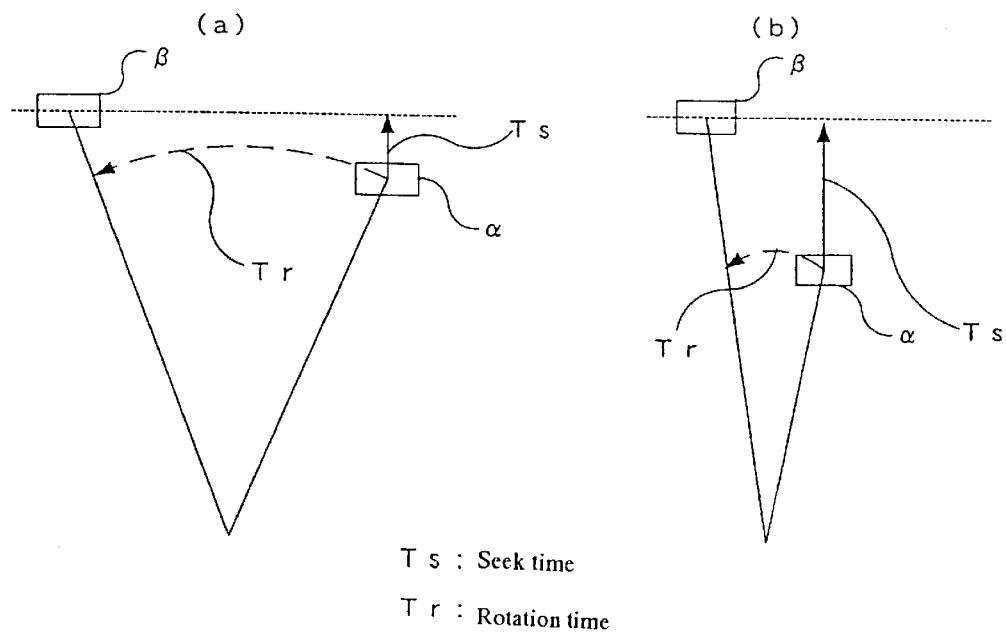
T s : Seek time
T r : Rotation time

[Figure 10]
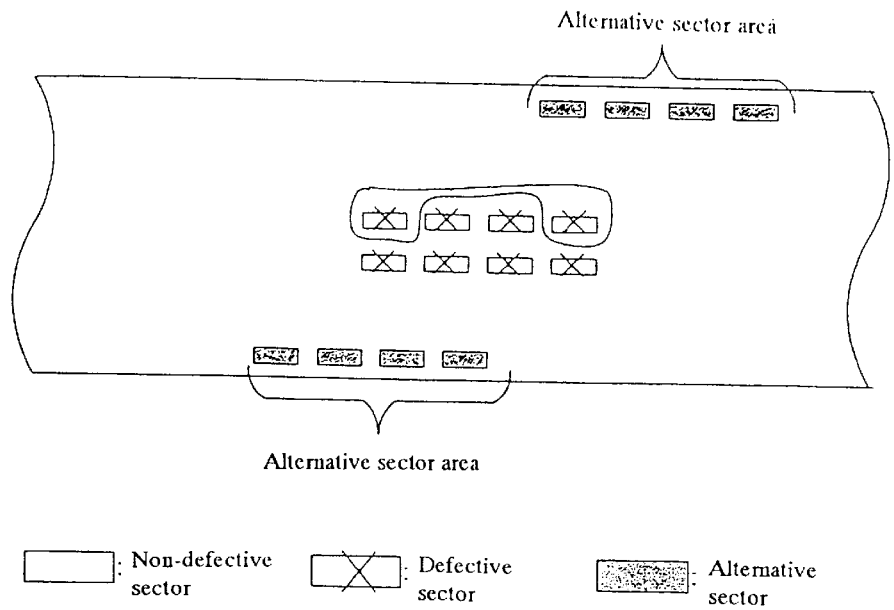
[Figure 11]
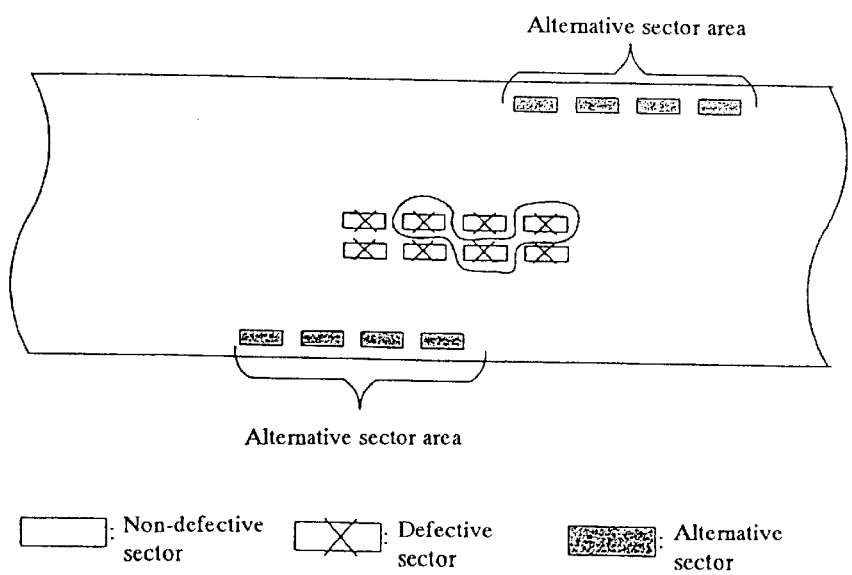

[Figure 12]
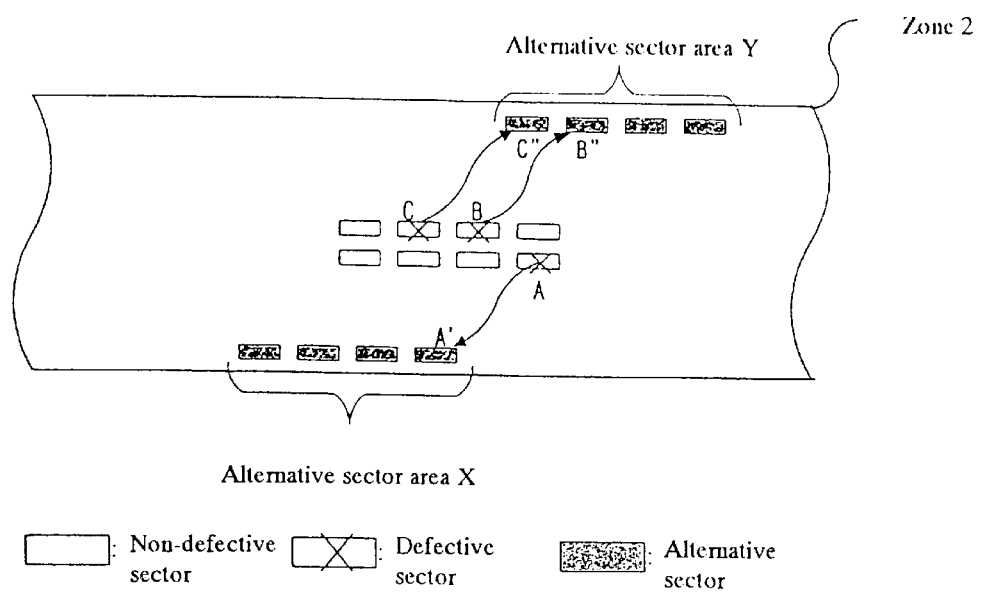

METHOD FOR ASSIGNING ALTERNATIVE SECTOR, METHOD FOR READING DATA, DISK DRIVE APPARATUS, AND APPARATUS FOR WRITING/READING AV DATA

BACKGROUND OF THE INVENTION

1. Technical Field

The present invention relates in general to a disk drive apparatus such as a hard disk drive, and in particular, to a technique for fast writing or reading data into or from an alternative sector if a data track of a recording medium contains a defective sector and more particularly, to a technique suitable for handling audio-visual data.

2. Description of the Related Art

A hard disk drive is one of the most popular external storage devices for a computer. As is well known, the surface of a hard disk (also called a "magnetic disk"), which is the recording medium in the hard disk drive, is divided into circular tracks and each track is radially divided into sectors, which are the smallest storage units on the disk. The tracks near the edge of the hard disk provide a higher line storage density than tracks nearer the center. With the "Zone-Bit Recording" scheme, which is a today's dominating data recording technique for hard disks, all the tracks are grouped into zones so that each zone has a constant line storage density. The length of each sector is typically 512 bytes, so tracks nearer the edge of the hard disk contain more sectors.

Tracks are not necessarily in good condition. A track may contain a defective sector in which data cannot be written or read due to a flaw or dust. If a defective sector is detected in the manufacturing process of a hard disk, an alternative sector is allotted in place of the defective sector. A defective sector may not always occur in the manufacturing process. It may occur in use after delivery. Also in such a case, an alternative sector is allotted in place of the defective sector. The allotment of an alternative sector in a manufacturing process is called "assignment" and the allotment of an alternative sector after delivery is called "re-assignment."

A group of sectors to be used as alternative sectors are positioned in a specific area on a hard disk. For example, in a case of the above-described zone-bit recording the alternative sector area may be provided in a specific area in an outer track and an inner track of each zone in the radial direction of the disk. Therefore an alternative sector and an original replaced sector are typically not in the same track. When data stored in the alternative sector is read, the magnetic head actuator of the hard disk drive should perform a seek operation from a track containing the original sector to the inner or outer track in the same zone. Because the seek operation is performed each time data is read from the re-assigned alternative sector, the performance of the hard disk drive momentarily decreases when alternative sectors are successively accessed to read data.

The re-assignment is performed to an alternative sector in the nearest sector area to the defective sector. Therefore, if a major defect occurs in the radially middle of the zone (hereinafter called simply the "middle of a zone") and a number of sectors become defective, the re-assignment may be performed to alternative sectors in both of the inner and outer alternative sector area. This requires seek operations between the inner alternative sector and the outer alternative sector, thereby aggravating the momentary performance decrease. Especially when audio/visual data is handled, the momentary performance decrease may lead to a momentary halt of a moving image or a sound skip and therefore should be taken seriously compared to cases where computer data is handled.

Various solutions to the performance decrease due to seek operation have been proposed.

For example, Published Unexamined Patent Application No. 5-66999 proposes a method for storing and managing data recorded in an alternative sector on a hard disk in cache memory of the hard disk apparatus. In the hard disk apparatus, data in the alternative sector is stored and managed in the cache memory, which is fast memory, and when the data is to be read, the data in the cache memory is accessed and read instead of accessing the hard disk which takes much time for an access. Thus the data can be read quickly.

Published Unexamined Patent Application No. 11-232046 discloses a method for reading, in addition to data stored in an alternative sector to be read, data stored in an alternative sector subsequent to an alternative sector and storing the data in memory for alternative sector. With this method, instead of accessing a plurality of alternative sectors separately, data stored in the plurality of sectors are accessed and read at a time, thereby reducing the number of accesses. In addition, because a hard disk takes time of milliseconds for an access whereas the memory allows for access time of nanoseconds, time required for reading data from alternative sectors can be significantly reduced.

For magneto-optical disks, Published Unexamined Patent Application No. 8-167250 discloses an apparatus which allows a defect remedy process to be performed quickly by providing in a disk drive a buffer storage section formed of semiconductor memory as a backup storage for temporarily storing data, besides conventional alternative sectors.

The above-mentioned approaches described in Published Unexamined Patent Applications Nos. 5-66999, 11-232046, and 8-167250 are effective for the reduction of time required for reading data from alternative sectors.

The technology disclosed in Published Unexamined Patent Application No. 5-66999 previously stores all data stored in all alternative sectors of a hard disk in cache memory. Today, this method for storing data stored in all alternative sectors in cache memory is impractical because the storage capacity of recent hard disk devices is enormous.

Published Unexamined Patent Application No. 11-232046 provides the description of reading data in alternative sectors the number of which optimized by the memory device. It, however, does not propose a specific method for optimizing the number of alternative sectors for reading data from the alternative sectors.

The technology disclosed in Published Unexamined Patent Application No. 8-167250 involves the provision of a buffer storage section. However, providing such a new component increases the cost of the product.

Therefore, it is an object of the present invention to provide a method for reading data in alternative sectors faster without providing additional memory for storing data stored in alternative sectors, that is, without adding a new hardware component to a hard disk drive, unlike Published Unexamined Patent Application No. 8-167250.

SUMMARY OF THE INVENTION

If a number of defective sectors occur in the middle of a zone and they are within a given distance from one another, data to be written in these sectors are likely to be a series of related items of data and it would be effective to write the data in alternative sectors in one of the inner and outer alternative sector areas in the zone regardless of the distance between each defective sector and the outer or inner alternative sector area. With conventional methods in which defective sectors are re-assigned to inner or outer alternative sectors depending on the distance between a defective sector and the inner or outer area in a zone, a series of related items of data is re-assigned both of the inner and outer alternative sectors in the zone, therefore a seek operation is required between the inner and outer areas of the zone in order to read the data. On the contrary, with the method described earlier in which defective sectors are re-assigned to alternative sectors in one of the inner and outer alternative sector areas if they are within a given distance from one another, the seek operation across the zone is not required in order to read a series of related items of data from the alternative sectors. This means that data can be read faster from the alternative sectors.

While the method has been described with respect to an example in which a number of defective sectors are re-assigned to alternative sectors in one of the inner and outer areas if they are within a given distance from one another, in other words, the physical address of the sectors are successive, the re-assignment may be based on time or the logical addresses of the sectors. That is, when a re-assignment to one alternative sector occurs and then another re-assignment to another alternative sector occurs within a predetermined time, these re-assignments may be performed to alternative sectors in one of the inner and outer areas. If the logical address of a defective sector re-assigned and the logical address of the next defective sector to be re-assigned are adjacent to each other, these re-assignments may be performed to alternative sectors in one of the inner and outer areas.

The present invention solves the problem described earlier by a method for assigning/re-assigning an alternative sector on a zone-bit-recording-scheme recording disk, comprising: a first step of assigning/re-assigning a preceding alternative sector to an alternative sector in the inner or outer alternative sector area in a zone; and a second step of assigning/re-assigning another alternative sector to the same alternative sector area as the inner or outer alternative sector area in the zone to which the preceding alternative sector is assigned/re-assigned if the assignment/re-assignment of another alternative sector is required after the assignment/re-assignment of the preceding alternative sector and another alternative sector has a predetermined relation to the preceding alternative sector.

In the alternative sector assignment/re-assignment method according to the present invention, the second step may be performed if a sector assigned/re-assigned to another alternative sector exists in the zone in which a sector assigned/re-assigned to the preceding alternative sector exists. Furthermore, according to the present invention, whether another alternative sector has a predetermined relation to the preceding alternative sector or not may be determined by comparing the address of the sector assigned/re-assigned to the preceding alternative sector with the address of the sector assigned/re-assigned to another alternative sector. Both of the physical and logical addresses may be used. Whether said another alternative sector has a predetermined relation to said preceding alternative sector or not may be determined based on the amount of time elapsed between the assignment/re-assignment of said preceding alternative sector and the time at which the assignment/re-assignment of said another alternative sector is required. That is, an address or time is used as an indication for determining whether data is a series of related items of data.

In order to take advantage of the above-described assignment/re-assignment of alternative sectors more effectively, the present invention provides a method for reading data from a recording disk having an alternative sector area in which a collection of alternative sectors is provided and non-defective sectors, the method comprising: a first step of accessing a preceding alternative sector storing data for which a read request is made to read said data; a second step of reading data from an alternative sector succeeding the preceding alternative sector during the rotational latency required for a magnetic head to access a non-defective sector storing the next data for which a read request is made; and a third step of accessing the non-defective sector to read data after the second step.

According to the data reading method of the present invention, during reading data from one alternative sector, data is read from another alternative sector. Thus, the method eliminates the need for performing a seek operation each time data is read from an alternative sector, thereby allowing data to be read from the alternative sectors faster.

The present invention is especially effective if the above-described alternative sector assignment/re-assignment method of the present invention is applied to the preceding alternative sector and the succeeding alternative sector in the same inner or outer alternative sector area in the same zone. That is, according to the alternative sector assignment/re-assignment method of the present invention, a plurality of alternative sectors storing a series of related items of data are adjacent to each other in the inner or outer area in a zone, thus allowing a data read operation from different sectors to be performed faster.

In the present invention, preferably the rotation time required for the magnetic head to reach the non-defective sector storing said next data for which the read request is made from the preceding alternative sector from which the data is read at the first step is compared with the seek time and if it is determined that the rotation time is not equivalent to said seek time, the above mentioned second step is performed.

The present invention provides a disk drive apparatus that performs the alternative sector assignment/re-assignment method described above. The disk drive apparatus according to the present invention comprises a disk recording medium being capable of random access and having an alternative sector area in which a group of alternative sectors are provided; a storage section for storing the position of an alternative sector assigned/re-assigned precedently; a determination section for determining whether the assignment/re-assignment of an alternative sector succeeding said preceding alternative sector is required within a predetermined time; and a directive section for assigning/re-assigning the succeeding alternative sector to the same alternative sector area in which the alternative sector the position of which is stored in the storage section exists if the determination section determines that the assignment/re-assignment of the succeeding alternative sector is required within the predetermined time.

The present invention also provides a disk drive apparatus comprising: a disk recording medium being capable of random access and having an alternative sector; a storage section for storing the address of an alternative sector assigned/re-assigned precedently; a determination section for determining whether the physical address of first defective sector causing the assignment/re-assignment of the preceding alternative sector is adjacent to the physical address of a second defective sector for which it is determined that assignment/re-assignment of an alternative sector is required after the assignment/re-assignment of the preceding alternative sector; and an assignment/re-assignment section for assigning/re-assigning the address of the alternative sector of the second defective sector so that the address is adjacent to the address stored in the storage section if the determination section determines that the physical address of said first defective sector and the physical address of the second defective sector are adjacent to each other.

Furthermore, the present invention provides a disk drive apparatus comprising: a disk recording medium being capable of random access and having an alternative sector; a storage section for storing the position of an alternative sector assigned/re-assigned precedently; a determination section for determining whether the logical address of a defective sector assigned/re-assigned to the preceding alternative sector is close to the logical address of a defective sector for which it is determined that assignment/re-assignment of an alternative sector is required after the preceding alternative sector; a directive section for assigning/re-assigning the defective sector for which it is determined that the assignment/re-assignment of an alternative sector to an alternative sector near the position of the alternative sector stored in the storage section if the determination section determines that the logical address of the defective sector assigned/re-assigned to the preceding alternative sector is close to the logical address of said defective sector for which it is determined that the assignment/re-assignment of the alternative sector is required.

Examples of a typical disk recording medium capable of random access in the disk drive apparatus of the present invention include a hard disk, flexible disk, and magneto-optical disk. Therefore, the present invention can be applied to a hard disk drive. However, this is just an example of the application of the present invention and does not limit the present invention.

Furthermore, the present invention provides a disk drive apparatus comprising a disk recording medium being capable of random access and having a non-defective sector and an alternative sector, read control means for controlling data reading from said disk recording medium, and a head for reading said data according to the read control means, wherein the read control means controls data reading so as to read data from a different alternative sector besides an alternative sector if a read instruction is issued for data stored in the alternative sector; and the data reading from the different alternative sector is performed until the head is no longer allowed to access a non-defective sector in which the next data to be read is stored.

In the disk drive apparatus, the disk recording medium has circumferentially separated zones, each of which having a different data storage capacity, and alternative sector areas consisting of a collection of alternative sectors on the inner and outer sides of each zone; the different alternative sector is assigned/re-assigned to the inner or outer alternative sector area in which the alternative sector exists.

The present invention described above may be effectively applied to audio-visual data reading or writing. Because a momentary performance decrease may lead to a momentary halt of a moving image or a sound skip, there is a strong demand for faster data reading from alternative sectors in the audio-visual data applications. To meet this demand, the present invention proposes an apparatus for reading and writing audio-visual data, comprising a hard disk which audio-visual data is read from and written on and employs a zone-bit-recording-scheme, a write control section for controlling writing audio-visual data on the hard disk, and a read control section for controlling reading audio-video data from the hard disk, wherein: the hard disk has an alternative sector area consisting of a collection of alternative sectors in each zone; the write control section performs the assignment/re-assignment of a succeeding alternative sector to the same alternative sector area as the assignment/re-assignment of a preceding alternative sector, if the assignment/re-assignment of a preceding alternative sector and the assignment/re-assignment of a preceding alternative sector arise and data to be written in said succeeding alternative sector and data written in said preceding alternative sector can be regarded as data constituting a sequence of audio-visual items of data; and the read control section issues an instruction to read the audio-visual data stored in the alternative sector by said preceding assignment/re-assignment besides the audio-visual data stored in the alternative sector by the succeeding assignment/re-assignment.

BRIEF DESCRIPTION OF THE DRAWINGS

The novel features believed characterics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 1 shows one embodiment of the re-assignment method according to the present invention;

FIG. 2 shows one embodiment of the data reading method according to the present invention;

FIG. 3 shows one embodiment of the data reading method according to the present invention;

FIG. 4 shows one embodiment of the hard disk drive apparatus according to the present embodiment;

FIG. 5 is a flowchart illustrating one embodiment of the initialization process according to the present invention;

FIG. 6 is a flowchart illustrating one embodiment of the re-assignment method according to the present invention;

FIG. 7 is a flowchart illustrating one embodiment of the data reading method according to the present embodiment;

FIG. 8 shows a relation between seek time and rotation time;

FIG. 9 shows a relation between seek time and rotation time;

FIG. 10 shows another embodiment of the re-assignment method according to the present invention;

FIG. 11 shows another embodiment of the re-assignment method according to the present invention; and FIG. 12 shows a re-assignment method according to a prior art.

DETAILED DESCRIPTION OF THE PREFERRED EMBODIMENT

Embodiments of the present invention will be described with reference to the accompanying drawings.

FIG. 1 is a drawing for explaining one embodiment of a re-assignment method according to the present invention. FIG. 1(a) shows a hard disk using a zone-bit-recording-scheme. The hard disk is separated into zones 1 to 4. The number of zones does not reflect any actual hard disk.

FIG. 1(b) shows an enlarged view of a part of zone 2. The enlarged view shows the circular zone 2 in linear form. In FIG. 1(b), sectors A, B, and C in the middle of zone 2 contain a defect. They are assumed to be defective sectors.

Alternative sector area X comprising a plurality of alternative sectors is provided in the inner region of zone 2 and alternative sector area Y comprising a plurality of alternative sectors is provided in the outer area of zone 2.

It is assumed that first a request for writing data "a" into sector A is made but the data is written into alternative sector A' in alternative sector area X because sector A is defective. Then a request for writing data "b" into sector B and re-assignment is performed to alternative sector B' succeeding alternative sector A. Similarly, defective sector C into which a write request of data "c" is made is re-assigned to alternative sector C'. Thus, successive items of data a, b, c are written into sectors A', B', and C' in the same alternative sector area X.

According to a prior art, re-assignment is performed to an alternative sector in an alternative sector area nearer the cylinder, therefore if a request for writing data "b" into sector B, re-assignment is made to alternative sector B" in alternative sector area Y on the inner side of zone 2 as shown in FIG. 12. Similarly, for data "c", re-assignment is made to alternative sector "C" near the sector C. Thus, data "a" of the successive data a, b, and c would be written into sector A' in alternative sector area X, and data "b" and "c" are written into successive alternative sectors B" and C", respectively, in the same alternative sector area Y.

Consider the seek operation of a magnetic head when data a, b, and c written with the above-described re-assignment method of the present invention and that of the prior art. According to the present invention shown in FIG. 1(b), because data a, b, and c are written in outer alternative sector area X, the seek distance of the magnetic head is at most half of the width of zone 2. On the contrary, according to the re-assignment method of the prior art shown in FIG. 12, the head should perform a seek over the distance equal to the width of zone 2. That is, it can be appreciated that the seek distance of the magnetic head when reading data can be reduced according to the present invention. The location of a plurality of defective sectors to which the re-assignment method of the present invention can be applied is not limited to that shown in FIG. 1. For example, a plurality of defective sectors may be apart from each other in the same track as shown in FIG. 10 or they may be in different tracks as shown in FIG. 11.

One embodiment of a method for reading data according to the present invention will be described below with reference to FIG. 2. FIG. 2 shows a zone on a hard disk. In FIG. 2, "A" indicates a defective sector causing re-assignment, "A'" indicates an alternative sector re-assigned for defective sector A, "C'" and "D'" indicate alternative sectors re-assigned for other defective sectors C, D (not shown), and "B" indicates a normal sector in which data is written. Data "a", "c", and "d" are written in alternative sectors A', C', and D', respectively, and data "b" is written in sector B.

When a read request for data "a" which would otherwise be written in defective sector A is made, the magnetic head performs a seek from sector A to alternative sector A' to read data "a" written in it. The hard disk is rotating. Because data "b", which is the next data to be read, is written in sector B, the magnetic head moves to a track containing sector B, accesses sector B to read data "b" after a rotational latency, accesses alternative sector C' to read data "c", then accesses alternative sector D' to read data "d" according to the prior art. This means that about two rotations of the hard disk are required for reading data a, b, c, d. According to the present invention, on the other hand, the head, after accessing sector A' to read data "a", previously reads data c and d from alternative sectors C' and D' subsequent to the sector A' for which no read request is made yet. This operation for reading data written in an alternative sector for which no request is made yet is called "pre-reading". Then the magnetic head performs a seek to access sector B to read data b after following a trajectory shown in FIG. 2, that is, a rotational latency. Thus, according to the method for reading data of the present invention, data a, b, c, d can be read during one rotation of the hard disk, allowing the data to be read faster.

While alternative sectors A' to D' are arranged successively in the example shown in FIG. 2, other arrangements such as shown in FIG. 3 may be possible. The example shown in FIG. 3 is the same as that in FIG. 2, except the positions of sector B and alternative sectors C', D'.

In FIG. 3, when a read request for data "a" is made first, the magnetic head accesses from sector A to alternative sector A' to read data "a" written in it. When the next request is made for data "b" in sector B, the magnetic head remains in the track where alternative sector A' exists to read data c written in alternative sector C' in that track instead of performing a seek to the track in which sector B exists. After reading data c, the magnetic head performs a seek to sector B to read data b written in it.

This example is different from the example in FIG. 2 in that the data d written in alternative sector D' is not read. If the head attempted a seek to sector B after reading data d written in alternative sector D', the head would not be able to access sector B in time. The head therefore would need to wait one rotation of the hard disk in order to access sector B. This is contrary to the object of the present invention of speeding up a data read operation. Therefore, according to the present invention, the head is only allowed to pre-read data written in an alternative sector during a permissible time period in which the head can access a sector containing the next data requested, in other words, during a rotational latency.

An embodiment of the present invention applied to a hard disk drive apparatus will be described below with reference to the accompanying drawings.

FIG. 4 shows a block diagram of the hard disk drive apparatus according to the present invention. In FIG. 4, the hard disk apparatus (HDD) 1 comprises a HDC/MPU 10 consisting of a hard disk controller (HDC) and a micro processing unit (MPU), a buffer 20, and a disk enclosure (DE) 30, wherein the HDC/MPU 10 is coupled to a host 50 through an inter face (I/F) 40.

HDC 11 of the HDC/MPU 10 includes a host interface controller (HIC) 12, a memory manager (MM) 13, and a drive controller (DV) 14. The HDC 11 and the MPU 15 are interconnected as shown in FIG. 4 and a read only memory (ROM) 16 is provided between them. Provided in the DE 30 are a hard disk on which data is recorded and a magnet head for writing and reading data on and from the hard disk. The hard disk and the magnetic head are omitted in this figure.

Data to be written in the HDD 1 is transferred from the host 50 through the I/F 40 and temporarily stored in the buffer 20 through the HIC 12 and the MM 13. The buffer 20 includes a re-assign data buffer 20a for storing data read from an alternative sector on the hard disk. The data temporarily stored is then written on the hard disk in the DE 30 through the MM 13 and DV 14 according to the instruction from the MPU 15. When reading the data stored in the hard disk, the data is first stored in the buffer 20 through the DV 14 and the MM 13 and then output to the host 50 through the MM 13 and the HIC 12. Therefore, a method for assigning an alternative sector and a method for reading data of the present invention, which will be described below, are accomplished by the MPU 15 interpreting and executing firmware stored in the ROM 16.

A particular embodiment of the re-assigning method and the data reading method of the present invention will be described below with respect to the above-described hard disk drive apparatus 1. The embodiment comprises an initialization process, a process on the occurrence of re-assignment, and a process for reading the re-assigned data from an alternative sector. The flow of each process is shown in a flowchart in FIGS. 5 to 7. The definition of the terms used in FIGS. 5 to 7 are as follows:

PDLAR (Previous Defect Logical Address Register): the register that indicates the logical address of the previous sector from which re-assignment is performed.

PDPAR (Previous Defect Physical Address Register): the register that indicates the physical address of the previous sector from which re-assignment is performed.

PRTR (Previous Re-assign Time Register): the register that indicates time elapsed after the previous re-assignment to the current time. The value of this register increments in conjunction with the time count of an internal timer. The initial value is zero. If the register overflows, the maximum value is retained. Alternatively, the initial value may be the maximum value and the value may decrement with time. If an underflow occurs, the minimum value is retained. The present embodiment employs the former method.

PRAR (Previous Re-assign Address Register): the register indicates the logical or physical address of the previous sector to which re-assignment is performed.

LBA (Logical Block Address): the logical address of the current sector (in this case, a defective sector).

CHS (Cylinder Head Sector): the physical address of the current sector (in this case, a defective sector).

As shown in FIG. 5, the PDLAR, PDPAR, PRTR, and PRAR in the registers on the hard disk are cleared during an initialization process at step 101 ("S101" in FIG. 5, and likewise for the following steps). The PRTR is cleared to zero (the initial value), then will increment with time. Then at step 102, re-assignment data (data read from an alternative sector. Hereinafter this notation will be omitted.) stored in the re-assign data buffer 20a is cleared.

If re-assignment is required due to a defect in a sector on the hard disk, a determination is made as to whether the PDPAR and the CHS are in the same zone at step 201 (S201 in FIG. 6, and likewise for the following steps). That is, a determination is made as to whether the previous sector from which re-assignment was performed and the sector in which the defect is detected, that is, the current sector from which the re-assignment is to be performed are in the same zone. This determination is made because if the previous sector from which re-assignment was performed and the current sector from which re-assignment is to be performed are in different zones, data items (for example audio-visual data) to be written into each sector are not related to each other and it make little sense to apply the re-assignment method of the present invention to the data. If they are in the same zone, the process proceeds to step 202. If they are in different zones, the process proceeds to step 205.

At step 202, whether the value in the PRTR is less than or equal to a predetermined value is determined. That is, whether the time elapsed between the previous re-assignment and the current time does not exceeds the predetermined value is determined. If it is less than or equal to the predetermined value, the data which should have been written in the previous sector and the data to be written in the current sector for which re-assignment is performed are assumed to be related to each other, that is, consist of a sequence of data items and the re-assignment method of the present invention will be applied to the data.

If the PRTR is less than or equal to the predetermined value, the process proceeds to step 206. If it exceeds the predetermined value, the process proceeds to step 203.

At step 203, whether the PDLAR and the LBA are close to each other is determined. That is, a determination is made as to whether the difference between the logical address of the previous sector from which re-assignment was performed and that of the current sector from which re-assignment is performed is within a predetermined value range. If it is within the predetermined value range, the data which should have been written in the previous sector for which re-assignment was performed and the data to be written in the current sector for which re-assignment is performed are assumed to be related to each other and the re-assignment method of the present invention will be applied. If it is determined that the difference between logical addresses of the PDLAR and the LBA is below or equal to the predetermined value, the process proceeds to step 206. If it is determined that the deference exceeds the predetermined value, the process proceeds to step 204.

At step 204, whether the PDPAR and the CHS are close to each other is determined. That is, a determination is made as to whether the difference between each of the cylinder number (C), head number (H), and sector number (S) of the physical address of the previous sector for re-assignment and each of those of the current sector for re-assignment is within a predetermined value range. If it is within the predetermined value range, the data which should have been written in the previous sector and the data to be written in the current sector from which re-assignment is performed are assumed to be related to each other, like step 203, and the re-assignment method of the present invention will be applied. If it is determined that the difference between the PDPAR and the CHS is less than or equal to the predetermined value, the process proceeds to step 206. If it is determined that the difference exceeds the predetermined value, the process proceeds to step 205.

At step 205, a conventional re-assignment process is performed. That is, re-assignment is made to the inner or outer re-assignment area, whichever is nearer, in the zone where the cylinder at which the defective sector exists. The particular address to which the re-assignment is performed determined by the access time, the availability of storage areas reserved for re-assignment, and other factors.

At step 206, a determination is made as to whether there is a free address within a predetermined range subsequent to the PRAR. That is, a determination is made as to whether an address adjacent to the logical or physical address of the previous alternative sector to which re-assignment is performed is available or not. The term "subsequent" herein refers to the direction in which the magnetic head accesses later due to the rotation of the hard disk. The term "adjacent" is not limited to physical adjacency. If there is a free address, the process proceeds to step 207, where the data is assigned to the re-assign address within the predetermined range subsequent to the PRAR to perform the re-assignment. This re-assignment is of the present invention. After the completion of the re-assignment, the process proceeds to step 208. On the other hand, if there is no free address, the process proceeds to step 205, where the data is written according to a conventional re-assignment process.

After the completion of the conventional re-assignment process or the re-assignment process of the present invention, a post-process is performed at step 208. In the post-process, first the PRTR is cleared to zero, which is the initial value. The LBA is set in the PDLAR and the CHS is set in the PDPAR. That is, the logical and physical addresses are changed from those of the previous sector re-assigned into those of the current sector to be re-assigned.

This completes the sequence of steps of the re-assignment process.

The process for reading re-assigned data from an alternative sector will be described with reference to FIG. 7.

When a request for an access to a re-assigned data occurs, a determination is made as to whether the addressed data is contained in a re-assign data buffer 20a (in FIG. 7 and hereinafter called simply the "buffer") at step 301 ("S301" in FIG. 7, and likewise for the following steps). If it is determined that the addressed data is contained in the buffer, the data is transferred to a host 50 at step 308, then the process proceeds to step 307. On the other hand, if the addressed data is not contained in the buffer, the process proceeds to step 302, where the alternative sector to which the data is re-assigned is accessed to read the data. After the data is read, the process proceeds to step 303.

Steps 303 and 304 are performed, after the data is read from the alternative sector at step 302, to determine whether the next data for which a read request is made is read from an appropriate alternative sector or from an alternative sector subsequent to the alternative sector.

At step 303, the estimated time required for the head to seek from the alternative sector accessed at step 302 to a sector with the physical address for which the next access request is made and the rotation time are calculated. Then whether the calculated estimated seek time and rotation time are equivalent to each other at step 304.

The process at steps 303 and 304 will be described with reference to FIGS. 8 and 9. In FIGS. 8 and 9, "a" represents the alternative sector from which data has been read and "b" represents the sector storing data for which the next read request is made. The estimated time required for the magnetic head to seek from the track containing alternative sector a to the track containing sector b is represented by Ts. The time required for the magnetic head positioned at alternative sector a to reach the radius at which original sector b was positioned by the rotation of the hard disk, that is, the rotation time, is represented by Tr. The estimated seek time Ts (hereinafter called simply the "seek time") can be calculated by using the spacing between the tracks and the seek speed of the magnetic head. The rotation time Tr can be calculated by using the angle q between alternative sectors a and b and the rotation speed of the hard disk.

FIG. 8 shows an example in which the estimated seek time is equivalent to the rotation time. In this case, after data is read from alternative sector a, sector b accessed to read data. FIG. 9 shows examples in which the estimated seek time is not equivalent to the rotation time. FIG. 9(a) shows an example in which the rotation time is longer than the seek time and FIG. 9(b) shows an example in which the rotation time is shorter than the seek time. In the example shown in FIG. 9(a), there is a sufficient time, that is, the rotational latency, to pre-read data from another alternative sector before accessing sector b. In the example shown in FIG. 9(b), sector b cannot be accessed immediately after reading data from alternative sector a. It is accessed after one hard disk rotation. This means that data can be read from another alternative sector during this rotation, that is, the rotational delay. Thus, data can be pre-read from other alternative sectors without wasting time in the examples shown in FIGS. 9(a) and 9(b). In the example shown in FIG. 8, on the other hand, reading data from another alternative sector after reading data from alternative sector a would unnecessarily delay the access of the magnetic head to sector b. Whether estimated seek time is equivalent to rotation time or not may be determined by whether the condition $0 \pounds Tr-Ts<T_0$ ($T_0$ is a predetermined value) is satisfied or not.

A determination is made as to whether the calculated seek time is equivalent to the rotation time at step 304, and if not, the process proceeds to step 305. If YES, the process proceeds to step 308, where data is read from a sector with the physical address for which the next access request is made.

At step 305, the re-assign buffer 20a is checked for available space. If there is no available space, the process proceeds to step 308, where data is read from a sector with the physical address for which the next access request is made. If there is available space, data is read from a subsequent alternative sector and stored in the re-assign data buffer 20a, at step 306.

At step 307, the rotational latency is continuously calculated during reading the subsequent re-assigned data from the alternative sector. When the rotational latency reaches zero, reading the re-assigned data from the alternative sector is completed and data is read from a sector with the physical address for which the next access request is made, as depicted at step 309.

As described above, because a plurality of defective sector are re-assigned to alternative sectors in one of the inner or outer area of a zone according to the present invention, a sequence of related items of data can be read from the alternative sectors without having to perform seek operations between the inner and outer areas of the zone. In addition, according to the present invention, when requested data is read from one alternative sector, data for which no read request yet is made is pre-read from another sector, thus eliminating the need for accessing the alternative sector later. Therefore, according to the present invention, the performance of the hard disk drive is not decreased during reading a sequence of related items of data, thus preventing a momentary halt or a moving image and sound skip during reading audio-visual data, for example. Furthermore, the present invention does not require the addition of any new hardware component to a conventional hard disk drive apparatus and therefore is advantageous in terms of the costs of the apparatus as well.

While the invention has been particularly shown and described with reference to a preferred embodiment, it will be understood by those skilled in the art that various changes in form and detail may be made therein without departing from the spirit and scope of the invention.

What is claimed is:

1. A method for assigning/re-assigning an alternative sector on a zone-bit-recording-scheme recording disk, said method comprising the steps of:

a first step of assigning/re-assigning a preceding alternative sector to an alternative sector in an inner or outer alternative sector area in a zone; and a second step of assigning/re-assigning another alternative sector to the same alternative sector area as the inner or outer alternative sector area in said zone to which said preceding alternative sector is assigned/re-assigned if the assignment/re-assignment of said another alternative sector is required after the assignment/re-assignment of said preceding alternative sector and said another alternative sector has a predetermined relation to said preceding alternative sector.

2. The alternative sector assignment/re-assignment method according to claim 1, wherein said second step is performed if a sector assigned/re-assigned to said another alternative sector exists in the zone in which a sector assigned/re-assigned to said preceding alternative sector exists.

3. The alternative sector assignment/re-assignment method according to claim 1, wherein whether said another alternative sector has a predetermined relation to said preceding alternative sector or not is determined by comparing an address of the sector assigned/re-assigned to said preceding alternative sector with the address of the sector assigned/re-assigned to said another alternative sector.

4. The alternative sector assignment/re-assignment method according to claim 1, wherein, whether said another alternative sector has a predetermined relation to said preceding alternative sector or not is determined based on an amount of time elapsed between the assignment/re-assignment of said preceding alternative sector and the time at which the assignment/re-assignment of said another alternative sector is required.

5. A method for reading data from a recording disk having an alternative sector area in which a collection of alternative sectors is provided and non-defective sectors, said method comprising the steps of:
a first step of accessing a preceding alternative sector storing data for which a read request is made to read said data;
a second step of reading data from an alternative sector succeeding said preceding alternative sector during a rotational latency required for a magnetic head to access a non-defective sector storing the next data for which a read request is made; and
a third step of accessing said non-defective sector to read data after said second step.

6. The data reading method according to claim 5, wherein said preceding alternative sector and said succeeding alternative sector exist in the same alternative sector area.

7. The data reading method according to claim 5, wherein a rotation time required for the magnetic head to reach the non-defective sector storing said next data for which the read request is made from said preceding alternative sector from which the data is read at said first step is compared with a seek time, and if it is determined that said rotation time is not equivalent to said seek time, said second step is performed.

8. A disk drive apparatus comprising:
a disk recording medium being capable of random access and having an alternative sector area in which a group of alternative sectors are provided;
a storage section for storing a position of an alternative sector assigned/re-assigned precedently;
a determination section for determining whether the assignment/re-assignment of an alternative sector succeeding said preceding alternative sector is required within a predetermined time; and
a directive section for assigning/re-assigning said succeeding alternative sector to the same alternative sector area in which the alternative sector the position of which is stored in said storage section exists if said determination section determines that the assignment/re-assignment of said succeeding alternative sector is required within the predetermined time.

9. A disk drive apparatus comprising:
a disk recording medium being capable of random access and having an alternative sector;
a storage section for storing an address of an alternative sector assigned/re-assigned precedently;
a determination section for determining whether a physical address of a first defective sector causing said assignment/re-assignment of said preceding alternative sector is adjacent to the physical address of a second defective sector for which it is determined that assignment/re-assignment of an alternative sector is required after the assignment/re-assignment of said preceding alternative sector; and
an assignment/re-assignment section for assigning/re-assigning the address of the alternative sector of said second defective sector so that said address is adjacent to said address stored in said storage section if said determination section determines that the physical address of said first defective sector and the physical address of said second defective sector are adjacent to each other.

10. A disk drive apparatus comprising:
a disk recording medium being capable of random access and having an alternative sector;
a storage section for storing a position of an alternative sector assigned/re-assigned precedently;
a determination section for determining whether a logical address of a defective sector assigned/re-assigned to said preceding alternative sector is close to the logical address of a defective sector for which it is determined that assignment/re-assignment of an alternative sector is required after said preceding alternative sector;
a directive section for assigning/re-assigning said defective sector for which it is determined that the assignment/re-assignment of an alternative sector to an alternative sector near the position of the alternative sector stored in said storage section if said determination section determines that the logical address of said defective sector assigned/re-assigned to said preceding alternative sector is close to the logical address of said defective sector for which it is determined that the assignment/re-assignment of the alternative sector is required.

11. A disk drive apparatus comprising a disk recording medium being capable of random access and having a non-defective sector and an alternative sector, read control means for controlling data reading from said disk recording medium, and a head for reading said data according to said read control means, wherein:
said read control means controls data reading so as to read data from a different alternative sector besides one alternative sector if a read instruction is issued for data stored in said one alternative sector; and,
said data reading from said different alternative sector is performed until the time said head is no longer allowed to access a non-defective sector in which the next data to be read is stored.

12. The disk drive apparatus according to claim 11, wherein
said disk recording medium has circumferentially separated zones, each of which having a different data storage capacity, and alternative sector areas consisting of a collection of alternative sectors on the inner and outer sides of each zone;
said different alternative sector is assigned/re-assigned to said inner or outer alternative sector area in which said one alternative sector exists.

13. An apparatus for reading and writing audio-visual data, comprising a hard disk which audio-visual data is read from and written on and employs a zone-bit-recording-scheme, a write control section for controlling writing audio-visual data on said hard disk, and a read control section for controlling reading audio-video data from said hard disk, wherein:

said hard disk has an alternative sector area consisting of a collection of alternative sectors in each zone;

said write control section performs the assignment/re-assignment of a succeeding alternative sector to the same alternative sector area as the assignment/re-assignment of a preceding alternative sector, if the assignment/re-assignment of a preceding alternative sector and the assignment/re-assignment of a succeeding alternative sector arise and data to be written in said succeeding alternative sector and data written in said preceding alternative sector can be regarded as data constituting a sequence of audio-visual items of data; and said read control section issues an instruction to read the audio-visual data stored in the alternative sector by said preceding assignment/re-assignment besides the audio-visual data stored in the alternative sector by said succeeding assignment/re-assignment.

* * * * *